(12) United States Patent
Webb et al.

(10) Patent No.: US 9,591,540 B2
(45) Date of Patent: Mar. 7, 2017

(54) DATA CACHING IN A COMMUNICATION NETWORK

(75) Inventors: William Webb, Cambridge (GB); Neil MacMullen, Cambridge (GB)

(73) Assignee: Neul Ltd., Cambridge (GB)

( * ) Notice: Subject to any disclaimer, the term of this patent is extended or adjusted under 35 U.S.C. 154(b) by 394 days.

(21) Appl. No.: 14/126,073

(22) PCT Filed: Jun. 11, 2012

(86) PCT No.: PCT/EP2012/060978
§ 371 (c)(1),
(2), (4) Date: Apr. 7, 2014

(87) PCT Pub. No.: WO2012/171866
PCT Pub. Date: Dec. 20, 2012

(65) Prior Publication Data
US 2014/0219187 A1    Aug. 7, 2014

(30) Foreign Application Priority Data

Jun. 13, 2011   (GB) .................................. 1109829.0
Jun. 13, 2011   (GB) .................................. 1109830.8
(Continued)

(51) Int. Cl.
H04W 8/18        (2009.01)
H04W 36/22       (2009.01)
(Continued)

(52) U.S. Cl.
CPC ............ *H04W 36/22* (2013.01); *H04B 1/713* (2013.01); *H04L 5/0032* (2013.01); *H04L 7/041* (2013.01);
(Continued)

(58) Field of Classification Search
CPC . H04W 28/065; H04W 56/001; H04W 36/22; H04W 24/02; H04W 72/048;
(Continued)

(56) References Cited

U.S. PATENT DOCUMENTS 5,101,508 A * 3/1992 Owaki .................. H03J 5/0281
                                                455/158.2
7,974,637 B1   7/2011 Taveniku
(Continued)

FOREIGN PATENT DOCUMENTS

EP        1873674 A1    1/2008
JP     2006209457 A     8/2006
(Continued)

OTHER PUBLICATIONS

"3rd Generation Partnership Project; Technical Specification Group Services and System Aspects; Service Requirements for Machine-Type Communications (MTC); Stage 1 (Release 10)", 3GPP Standard; 3GPP TS 22.368, 3rd Generation Partnership Project (3GPP), Mobile Competence Centre; 650, Sophia-Antipolis Cedex, France, No. V10.0.0, Apr. 1, 2010, pp. 1-25, XP050402279.
(Continued)

*Primary Examiner* — Kwang B Yao
*Assistant Examiner* — Syed M Bokhari
(74) *Attorney, Agent, or Firm* — Slater Matsil, LLP (57) ABSTRACT

A communications network comprising: multiple base stations, each capable of communicating wirelessly with one or more wireless terminals; and a network core communicatively coupled to the base stations, the network core comprising: a data cache to which base stations can write data received from terminals, accessible from outside the network core in such a way that users external to the network core can write data to the data cache at times that are not scheduled by the network core; and a network controller
(Continued)

capable of controlling the operation of the base stations, the network controller being configured to schedule the propagation to the terminals of data stored in the data cache by allocating base station transmission bandwidth for the transmission of the data to one or more of the terminals.

15 Claims, 7 Drawing Sheets (30) Foreign Application Priority Data

| Jun. 13, 2011 | (GB) | ................................ | 1109836.5 |
|---|---|---|---|
| Jun. 13, 2011 | (GB) | ................................ | 1109837.3 |
| Jun. 13, 2011 | (GB) | ................................ | 1109840.7 |
| Jun. 13, 2011 | (GB) | ................................ | 1109844.9 |
| Jun. 13, 2011 | (GB) | ................................ | 1109848.0 |
| Jun. 13, 2011 | (GB) | ................................ | 1109850.6 |
| Jun. 13, 2011 | (GB) | ................................ | 1109853.0 |
| Jun. 13, 2011 | (GB) | ................................ | 1109854.8 |
| Jun. 13, 2011 | (GB) | ................................ | 1109863.9 |
| Jun. 13, 2011 | (GB) | ................................ | 1109867.0 |
| Jun. 13, 2011 | (GB) | ................................ | 1109874.6 |
| Sep. 30, 2011 | (GB) | ................................ | 1116910.9 |
| Feb. 22, 2012 | (GB) | ................................ | 1203068.0 |

(51) Int. Cl.
<table>
<tr><td>H04L 12/801</td><td>(2013.01)</td></tr>
<tr><td>H04L 7/04</td><td>(2006.01)</td></tr>
<tr><td>H04L 25/06</td><td>(2006.01)</td></tr>
<tr><td>H04W 4/00</td><td>(2009.01)</td></tr>
<tr><td>H04W 64/00</td><td>(2009.01)</td></tr>
<tr><td>H04W 72/12</td><td>(2009.01)</td></tr>
<tr><td>H04B 1/713</td><td>(2011.01)</td></tr>
<tr><td>H04L 5/00</td><td>(2006.01)</td></tr>
<tr><td>H04W 56/00</td><td>(2009.01)</td></tr>
<tr><td>H04W 36/00</td><td>(2009.01)</td></tr>
<tr><td>H04W 72/04</td><td>(2009.01)</td></tr>
<tr><td>H04W 28/06</td><td>(2009.01)</td></tr>
<tr><td>H04W 24/02</td><td>(2009.01)</td></tr>
<tr><td>H04L 29/08</td><td>(2006.01)</td></tr>
<tr><td>H04L 29/06</td><td>(2006.01)</td></tr>
<tr><td>H04B 7/26</td><td>(2006.01)</td></tr>
<tr><td>H04W 16/14</td><td>(2009.01)</td></tr>
<tr><td>H04W 88/10</td><td>(2009.01)</td></tr>
<tr><td>H04W 12/06</td><td>(2009.01)</td></tr>
</table>

(52) U.S. Cl.
CPC ............ *H04L 25/061* (2013.01); *H04L 47/10* (2013.01); *H04L 67/28* (2013.01); *H04L 69/18* (2013.01); *H04W 4/005* (2013.01); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(58) Field of Classification Search
CPC ......... H04W 72/1242; H04W 36/0066; H04W 56/0015; H04W 8/18; H04W 4/005; H04W 72/12; H04B 1/713; H04L 69/18; H04L 67/28; H04L 5/0032
USPC ........................................ 370/329, 252, 468
See application file for complete search history.

(56) References Cited

U.S. PATENT DOCUMENTS

| 2006/0173995 | A1 | 8/2006 | Moriwaki | |
|---|---|---|---|---|
| 2006/0209891 | A1* | 9/2006 | Yamada | H04L 12/5695 370/468 |
| 2007/0183352 | A1* | 8/2007 | Muhammad | H04W 72/1215 370/312 |
| 2010/0015956 | A1* | 1/2010 | Qu | H04N 7/163 455/414.1 |
| 2010/0099432 | A1 | 4/2010 | Glover et al. | |
| 2010/0157825 | A1* | 6/2010 | Anderlind | H04L 12/5695 370/252 |
| 2011/0007720 | A1* | 1/2011 | Shimizu | H04W 74/002 370/336 |
| 2011/0110291 | A1 | 5/2011 | Ishii | |
| 2011/0213871 | A1* | 9/2011 | DiGirolamo | H04W 4/00 709/223 |
| 2012/0163160 | A1* | 6/2012 | Himayat | H04W 28/06 370/216 |

FOREIGN PATENT DOCUMENTS

| JP | 2011103520 A | 5/2011 |
|---|---|---|
| WO | 9957697 A1 | 11/1999 |
| WO | 2007072814 A1 | 6/2007 |
| WO | 2009074717 A1 | 6/2009 |
| WO | 2010111006 A1 | 9/2010 |
| WO | 2010111428 A2 | 9/2010 |

OTHER PUBLICATIONS

"Machine-to-Machine Communications (M2M); Functional Architecture", ETSI Draft, 00002V0112, European Telecommunications Standards Institute (ETSI), 650, Sophia-Antipolis, France, No. V0.11.2, May 10, 2011, pp. 1-197, XP014062936.

Gang et al., "Smart (In-Home) Power Scheduling for Demand Response on the Smart Grid", Innovative Smart Grid Technologies (ISGT), 2011 IEEE PES, IEEE, Jan. 17, 2011, pp. 1-7, XP031860970.

* cited by examiner

DATA CACHING IN A COMMUNICATION NETWORK

This invention relates to a communication network for transferring data from a user external to the network to one or more of a plurality of wireless terminals operating in the network.

Although wireless communications are predominantly used by people, there are applications in which a machine may instigate communication with another machine without user input. Examples include electricity meters, which may send hourly updates to a client server, healthcare monitoring systems, which may link to staff pagers, and automotive sensors, which may link to automotive repair systems. These examples are primarily applications in which data is transferred from one machine to another or to a database or similar, where it may be processed by another machine. Eventually a person will benefit from this transfer of data but typically not from the radio transmission itself; rather people tend to benefit only once the machines have already transferred and/or processed the data. Data may also be transferred from the "client end" towards a remote machine. An example is a software or traffic update transmitted from a company providing traffic services to a GPS system installed in a car. Communications such as these may be termed "machine-to-machine" (M2M), "machine communication" or "machine network".

Existing protocols such as Zigbee, Bluetooth and Wi-Fi provide technologies for implementing short range machine communication. Typically the range of such communications is around 100 m. However, many machine communication applications require long range solutions that can cope not only with long distances but also with machines that are moving. Examples include automotive applications. Long range applications could be "piggy-backed" onto existing cellular networks that already have infrastructure in place to provide for country-wide (or even global) wireless communications with provision for billing and roaming. However, cellular networks have been optimised for communications involving people and in some respects are far from ideal for machine communication. The issues include:

Coverage is not perfect, particularly within buildings;
Terminals in machine networks cannot run off batteries for extended periods—longer than a week is problematic;
Cellular networks are not well adapted to short messages and so are inefficient for most machine applications;
Treating each terminal as a subscriber of a cellular network adds to costs including SIM cards, expanded billing systems and more; and
Cellular networks are moving towards providing higher date rates and away from the functionality required for machine communications.

A problem with establishing a new form of network for machine communications is the crowded nature of the electromagnetic spectrum. However, a network may be permitted to operate in so-called "white space" without being specifically allocated any part of the electromagnetic spectrum. "White space" refers to the unused parts of the spectrum in and around terrestrial television broadcasts. Typically white space is found in the UHF TV band and spans 450 MHz to 800 MHz, depending on the country. A large amount of spectrum has been made available for unlicensed or opportunistic access in this frequency range.

One issue with operating in white space is that the available bandwidth is variable and cannot be guaranteed. However, these limitations are well-matched to the capabilities of machine communications. Machine communications are typically tolerant of delays, dropped connections and high latency communications.

Operating in white space offers particular challenges. A network will have to be specifically designed to deal with those challenges if it is to be successful. Any such network may also have to be deployed nationally, or even internationally, if it is to be able to provide long range machine communications. Of course it would be an option for a party wanting to implement machine communications to design and deploy its own machine network. However, such an enterprise will be costly and also inefficient as individual clients deploy their own networks, resulting in overlapping coverage. Therefore, there is a need for a machine network structured to provide clients with a "backbone" into which they can essentially plug their own terminals and/or base stations, thereby satisfying clients' individual requirements without each client having to have their own network.

According to one embodiment of the invention, there is provided a communications network comprising multiple base stations, each capable of communicating wirelessly with one or more wireless terminals and a network core communicatively coupled to the base stations, the network core comprising a data cache to which base stations can write data received from terminals, accessible from outside the network core in such a way that users external to the network core can write data to the data cache at times that are not scheduled by the network core and a network controller capable of controlling the operation of the base stations, the network controller being configured to schedule the propagation to the terminals of data stored in the data cache by allocating base station transmission bandwidth for the transmission of the data to one or more of the terminals.

The network controller may be configured to allocate transmission bandwidth for the transmission of data from the data cache to the one or more terminals in dependence on an indication from the user who wrote the data to the data cache as to what proportion of available bandwidth should be used to transmit that data.

The network controller may be configured to allocate transmission bandwidth for the transmission of data from the data cache to the one or more terminals in dependence on a base station to which the one or more terminals are attached.

The network controller may be configured to allocate the transmission bandwidth in dependence on a loading associated with the base station to which the one or more terminals are attached.

The network controller may be configured to allocate the transmission bandwidth in dependence on a loading associated with the base station to which the one or more terminals are attached relative to a loading associated with others of the multiple base stations.

The data cache may be configured to store control data written to it by a user external to the network core, the communications network, by propagating the control data from the data cache to the one or more terminals, being configured to facilitate control of the one or more terminals by the user external to the network core.

The data cache may be accessible from outside the network core in such a way that users external to the network core can read data from the data cache at times that are not scheduled by the network core.

The network core may comprise a cache controller configured to schedule updates to the data cache in such a way that base stations can write data received from terminals to the data cache immediately on receiving that data but a user external to the network core can only read that data at a time scheduled by the cache controller.

According to a second embodiment of the invention, there is provided a communications network comprising multiple base stations, each capable of communicating wirelessly with one or more wireless terminals and a network core communicatively coupled to the base stations, the network core comprising a data cache to which base stations can write data received from terminals, accessible from outside the network core in such a way that users external to the network core can read data from the data cache at times that are not scheduled by the network core and a cache controller configured to schedule updates to the data cache in such a way that base stations can write data received from terminals to the data cache immediately on receiving that data but a user external to the network core can only read that data at a time scheduled by the cache controller.

The cache controller may be configured to schedule the time at which the data can be read by the external user in dependence on a predetermined update frequency associated with that data.

The cache controller may be configured to schedule the time at which the data can be read by the external user in dependence on a predetermined update frequency associated with that user.

The cache controller may be configured to schedule the time at which the external user can read the data so that there is a delay between the base stations writing that data to the data cache and that data being available to be read by the external user.

The network may comprise an authentication unit, and the cache controller being configured to pass the data to the authentication unit for authentication during the delay.

The authentication unit may be configured to authenticate the data as having originated from one of the terminals.

The communication network may comprise a billing entity configured to generate a billing record associated with the data during the delay.

The communications network may comprise a network controller capable of controlling the operation of the base stations and being configured to schedule updates to the data cache by allocating base station transmission bandwidth for the transmission of the data from one or more of the terminals to one of the multiple base stations.

The network core may comprise a network controller capable of controlling the operation of the base stations and being configured to allocate base station transmission bandwidth to transmissions by the one or more terminals in such a way as to accommodate unscheduled transmissions of data by those terminals.

The network controller may be capable of controlling the operation of the base stations and being configured to control the base stations in accordance with a protocol for machine-to-machine communications.

The network controller may be capable of controlling the operation of the base stations and configured to control the base stations in accordance with the Weightless protocol.

The network controller may be configured to format data for transmission by the base stations into a series of frames in which the duration of each frame is at least one second.

The network controller may be configured to format data for transmission by the base stations into a series of frames that each have a duration of 2 seconds.

The network core may comprise an authentication unit configured to authenticate any user eternal to the network core that attempts to access the data cache before permitting the user to read and/or write data to the data cache.

For a better understanding of the present invention, reference is made by way of example to the following figures, in which.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A communications network may comprise multiple base stations, each capable of communicating wirelessly with one or more wireless terminals. The network may also comprise a network core communicatively coupled to the base stations. The network core may comprise a data cache to which base stations can write data received from terminals. External users may be able to write to the same data cache. The network core is preferably configured to facilitate the exchange of data between an external user and its associated terminals via the data cache.

The data cache is suitably accessible from outside the network core in such a way that users external to the network core can read and/or write data to the data cache at times that are not scheduled by the network core. The data cache may be accessible on demand by the external user. The data cache may be permanently accessible to base stations. The data cache may perform a buffering function, enabling data to be stored and processed by the network core before it is either propagated to the terminals or made available to the external user. When there is congestion, the buffering capability of the data cache can be used to prioritise the propagation to the terminals of particular data, e.g. data for which there is a high quality of service requirement. It also permits traffic to be shaped to accommodate external users or terminals breaching prior agreements on the volume or type of traffic they expect to be transmitting, e.g. by wanting to transfer a greater volume of data over the network than had previously been agreed so that the network has to cope with an unexpected load.

The data cache essentially acts as a break in the link between an external user and its associated terminals: there is no end-to-end connection. Instead, both sides can read and/or write data into the data cache, which acts as a kind of "postbox" (or buffer) for both parties. The network may provide a management interface as an interface between an external user (also referred to as a "client") and terminals. The management interface may make it appear to external users that there is a direct connection between a user and the terminals.

The network may comprise a network controller capable of controlling the operation of the base stations. The base stations may be relatively simple devices. Suitably the network controller is configured to schedule the propagation to the terminals of data stored in the data cache by allocating base station transmission bandwidth for the transmission of the data to one or more of the terminals. Another controller, which may be the same as the network controller or a different controller, may be configured to schedule updates to the data cache in such a way that base stations can write data received from terminals to the data cache immediately on receiving that data but a user external to the network core can only read that data at a time scheduled by the controller. Data may be considered to be written immediately to the data cache if it is done so without any delay beyond what would be expected in transferring the data from the base station to the network core and from one logical element to another within the network core.

The data cache facilitates matching client requirements with communicating in white space, in which bandwidth is variable and cannot be guaranteed. The data cache enables an external user to write data to the cache at any time that is convenient. That data might include e.g. software updates or operational commands such as an instruction to enter sleep mode, or an instruction to report more or less frequently.

The data cache gives the external user the impression of connecting to and commanding the terminals directly. The network core may then schedule the data that is to be transmitted to the terminals at a time that is appropriate in view of the available bandwidth, current loading on the network etc. The client, however, does not have to be concerned with these technicalities. By propagating the control data from the data cache to the one or more terminals, the network core facilitates control of the one or more terminals by the user external to the network core.

The data cache also facilitates the necessary processing of data from the terminals by the network core. This processing is required because the network does not implement end-to-end communications, meaning that end-to-end authentication, which is used in most communications networks, is not appropriate. Instead, the network may be designed to implement a model in which terminals and external users are always free to push data onto the network core. The network core may only determine later whether or not that data is authentic and whether a user should be issued with a bill associated with that data. The network may be configured to organise data into relatively long frames, e.g. lasting one second or more, to provide time for the necessary processing.

Figure 1:
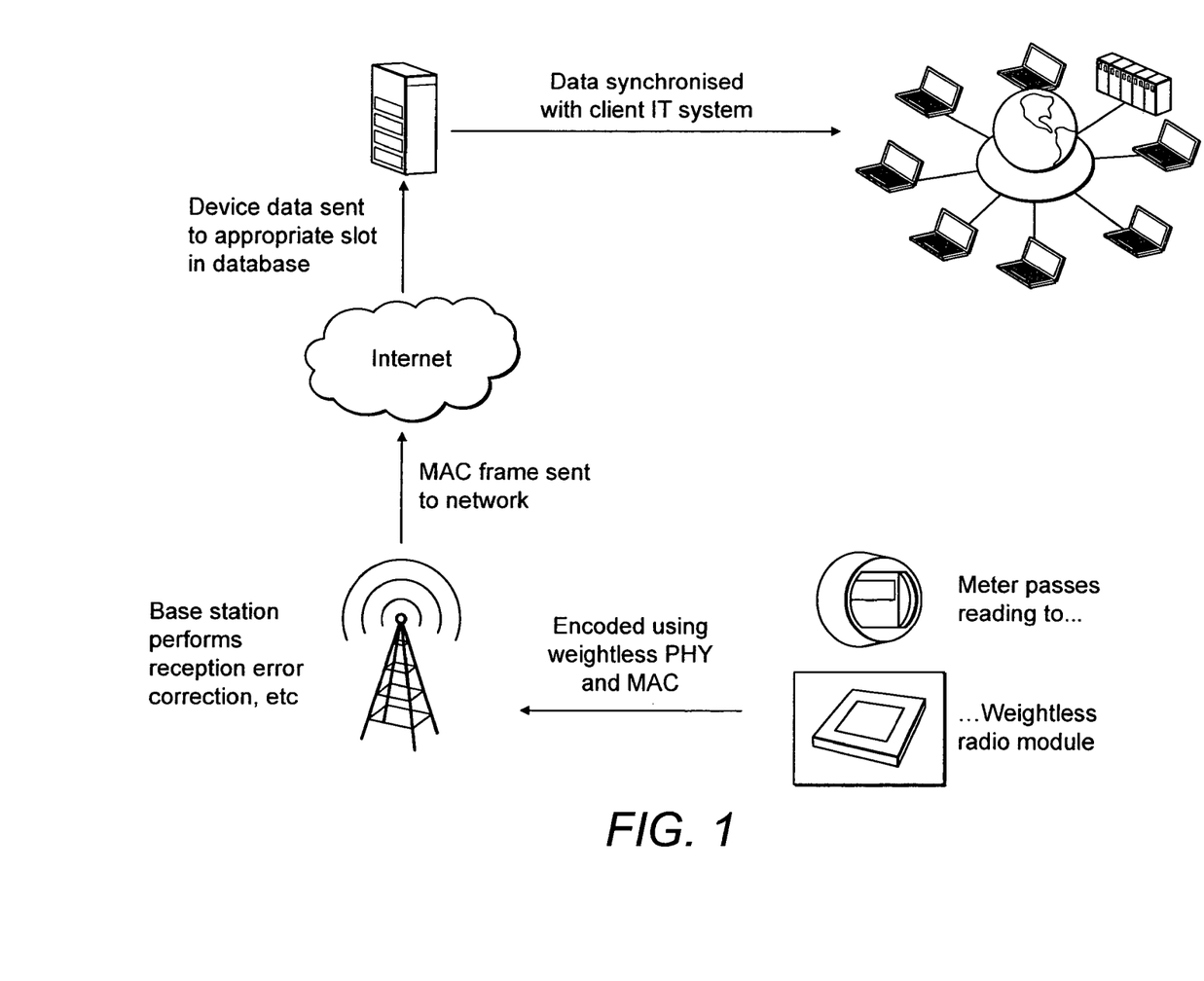
FIG. 1 shows an example of information flow in a communication network.

A high level of information flow in a communications network according to one embodiment of the invention is shown in FIG. 1. The information flow is shown by way of example with reference to a network that implements the Weightless protocol for machine communications. The diagram shows a terminal, which in this example is a smart meter, passing a reading to an inbuilt module capable of machine communications. The module encodes the readings and transmits it over the air interface to a base station, which transfers it to the core network. There the data is stored in a data cache and may be processed before being synchronised with the client's IT system.

Many communications between terminals and clients are expected to follow the direction shown in FIG. 1. However, data may equally flow in the other direction, enabling client data to be transferred from the client to the terminals. Client data will also be stored in the data cache on its journey from the network core to the terminals, enabling the data to be buffered while awaiting a scheduled transmission slot from the base station.

Figure 2:
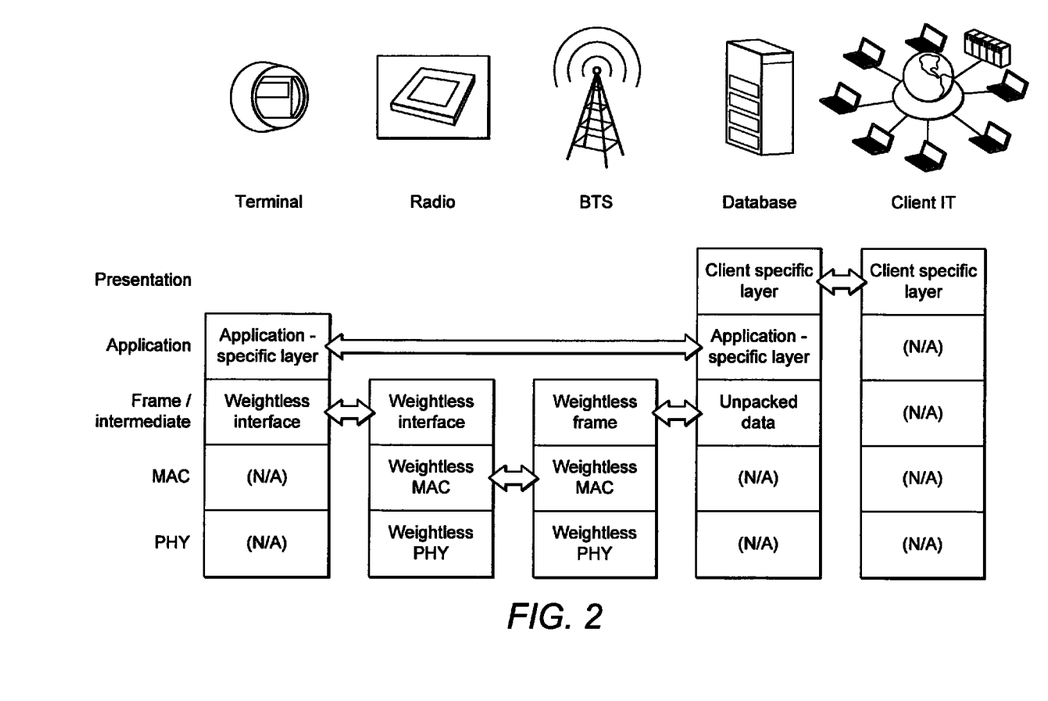
FIG. 2 shows an example of the functional layers of a communication network.

A functional layered diagram showing an example of how the different functional layers of the network may operate is shown in FIG. 2. At the highest level the data cache and the client's IT system communicate using a layer that is likely to be specific to that client. This may be achieved by way of a management interface that client to read and write data to the data cache. By so doing, the client can retrieve data from the terminals and write data to the terminals. Below that layer, an application layer in the terminal may communicate with an application layer within the data cache. This allows application specific coding to be implemented. The terminal communicates with a radio, which uses MAC and PHY layers to communicate with the base station. The base station sends frame level information to the data cache.

Figure 3:
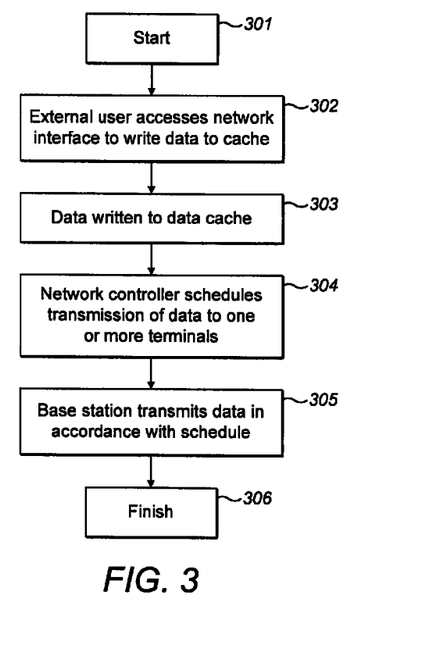
FIG. 3 shows an example of a process for propagating data from an external user to one or more terminals.

FIG. 3 shows an example of a process for propagating data from an external user to one or more terminals. The process starts in step 301. In step 302 the external user accesses a management interface to write the data to be communicated to the terminals. The data might include, for example, software updates, commands to change reporting frequency or commands to buffer data at the terminal before transmitting it to the network. The external user may identify specific terminals that the data is to be transferred to. The external user might also input into the management interface an indication of what proportion of the bandwidth the network should use when propagating the data to the terminals. The indication might include, for example, a quality of service requirement, a maximum time limit within which the data must be received by the terminal or a billing limit that should not be exceeded. In step 303 the data input by the external user is written to the data cache. This process may be performed under the control of a cache controller. In step 304 the network controller schedules the transmission of the data from the network core to the one or more terminals. This scheduling is important in networks that use white space because they are not allocated any specific part of the spectrum, meaning that bandwidth is limited and variable and transmissions have to be fitted around other devices operating in the same part of the spectrum. The network controller may allocate bandwidth to propagating the data in dependence both on the availability of that bandwidth and any indication that the external user has given about what proportion of the available bandwidth should be used to transmit the data. Using the data cache gives the network core the ability to buffer the data until its scheduled slot. In step 305 the base station transmits the data according to the schedule. The process terminates in step 306.

Figure 4:
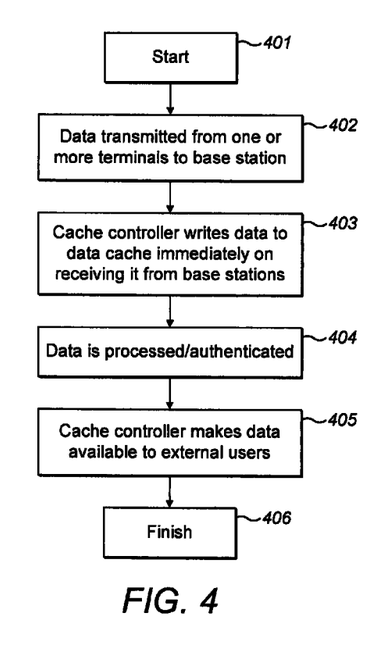
FIG. 4 shows an example of a process for propagating data from one or more terminals to an external user.

FIG. 4 shows an example of a process for transferring data from one or more terminals to an external user. The process starts in step 401. In step 402 data is transmitted by one or more of the terminals to a base station. The terminals may follow instructions received from the external user previously in making the transmission. For example, the terminal may previously have been instructed when and what to transmit and via what transmission means (e.g. via contended/allocated access). The data could include, for example, meter readings, sensor updates, a notification of an alert condition or a request for data/control input from the external user. The data may have been buffered by the terminal prior to transmission. This allows the external user to instruct the terminals to take meter readings every first time interval, e.g. every ten minutes, collect them together and transmit them every second time interval, e.g. every hour. The terminals usually transmit their data in time slots that have already been allocated to them by the base station. However, unallocated transmissions are also possible via contended access. In step 403 the cache controller writes the received data to the data cache. This happens as soon as the data is received by the network core. The data is, however, not made available immediately to the external user via the management interface. Instead, the data may be processed (step 404) including authentication and/or billing. The cache controller may also cause the data available to the external user to be updated in dependence on a predetermined update frequency associated with that user and/or the data to be updated. For example, a particular user may require meter readings from the terminals to be updated every 12 hours but need to be informed within 10 minutes if an alert message is received from one of the terminals, e.g. indicating a power cut. In step 405 the cache controller makes the data available to the external user. The external user is then able to read the data via the management interface. The process terminates in step 406.

Figure 5:
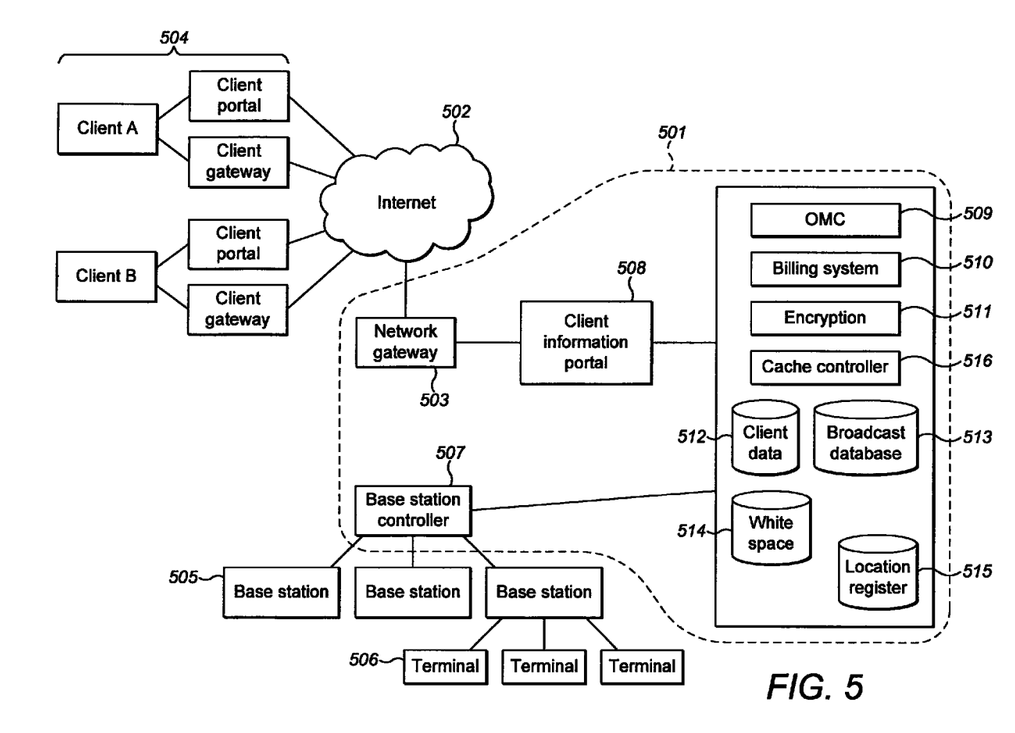
FIG. 5 shows an example of a communication network.

An example of a wireless network is shown in FIG. 5. The network comprises one or more base stations 505 that are each capable of communicating wirelessly with a number of terminals 506. Each base station may be arranged to communicate with terminals that are located within a particular geographical area or cell. The base stations transmit to and receive radio signals from the terminals. The terminals are suitably entities embedded in machines or similar that communicate with the base stations. Suitably the wireless network is arranged to operate in a master-slave mode where the base station is the master and the terminals are the slaves.

A base station controller 507 may control one or more base stations. The base station controller may provide a single point of communication for multiple base stations and distribute the information received to other network elements as required. That is, the network may be based around a many-to-one communication model. The core network 501 may be arranged to communicate with a client-facing portion 504 via the internet 502. In this way a client may provide services to the terminals via the wireless network.

Other logical network elements shown in this example are:
  Core network 501. This routes traffic information between base stations and client networks.
  Data cache 513. Traffic transmitted between the terminals and client networks is routed via the data cache.
  Cache controller 516. Controls the data cache to store incoming data from clients and base stations. Controls when data becomes accessible to clients via the client information portal. Passes data to the encryption and billing systems.
  Billing system 510. This records utilisation levels and generates appropriate billing data.
  Encryption system 511. This system holds terminal and base station authentication information. It encrypts data received from clients and authenticates and decrypts data received from terminals. The encryption system also holds the keys to enable this.
  Location register 516. This retains the last known location of the terminals.
  Broadcast register 514. This retains information on group membership and can be used to store and process acknowledgements to broadcast messages.
  Operations and maintenance centre (OMC) 509. This monitors the function of the network and raises alarms when errors are detected. It also manages frequency and code planning, load balancing and other operational aspects of the network.
  Whitespace database 515. This provides information on the available whitespace spectrum.
  Client information portal 508. This provides the management interface that allows clients to determine data such as the status of associated terminals, levels of traffic etc. Information is suitably presented to clients as a series of reports including e.g. incoming and outgoing data.

In practice, many of the logical network elements may be implemented as databases running software and can be provided on a wide range of platforms. A number of network elements may be physically located within the same platform.

Many communication networks authenticate a user before permitting any data transfer to take place. This is also the case for the network shown in FIG. 5 with respect to the link between the external user and the network core. This link is not always operational; it comes up on demand from the external user. The external user may have to provide authentication details to be able to "log on" to the management interface and access the data cache. The link is suitably a secure internet-based connection, such as an SSL link. The link between the base stations and the core network is different in that neither the base station nor the terminal is authenticated before being permitted to transfer data to the network core. Instead, data is simply placed in the data cache and authenticated later. This is practically realisable because the network is not subject to timeliness constraints of most communication networks since there is no end-to-end connection between the terminals and the external users. The link between the base stations and the network core may also be an internet-based connection but is preferably more secure than the link between the external users and the network core. Suitably, this link is always operational.

There is a risk that rogue messages could be injected maliciously into the network, either to cause the external user to receive false data or to cause the user to be charged for data it did not send. The most likely place for rogue messages to be injected is via a base station because the link from the base stations to the network core is very secure, and thus difficult to penetrate, and also because base stations need not be provided by or operated by the same entity that operates the network core (the base stations may be relatively simple devices acting under the control of a base station controller, which is described in more detail below). The network core is suitably configured not to trust the base stations.

Data passed to the network core by the terminals is preferably authenticated as having originated from those terminals before it is either billed or made available to the external user. This is for two reasons. First, to identify any data that has been injected for malicious reasons at the base station before it is passed on to the external user. Second, to ensure an external user is not charged for any rogue messages that have been injected into a compromised base station.

The authentication may be achieved by means of a mutually agreed key pair held by the terminal and the network core. The key may be hardwired into the terminal, e.g. in a SIM card or similar comprised in the terminal. The terminal then signs its messages using its key, which the network core is then able to verify with its own key. If the messages transmitted by the terminal are particularly short, the signature section of the message may outweigh the data section. The network core may therefore be configured to accept messages that are signed as a group, rather than individually. The cache controller may mark any unsigned messages with a flag indicating that those messages cannot be trusted (and therefore will not be billed/passed to an external user) until the signature is received. The decision as to whether the terminals sign every message or only groups of messages may be made by the external user and controlled via the management interface. In all other respects, however, the signature process is preferably invisible to the external user.

If the terminal is arranged to sign groups of messages, rather than signing messages individually, the external user may instruct the network to pass unauthenticated data to it before the source of that data has been verified. The external user may select this option, for example, if does not want its access to that data to be delayed while the network core waits for the message comprising the signature to be received. The management interface may mark any such data as being "unverified" or "not authenticated" so that the external user is aware that it has not been authenticated as originating from the terminal it purports to come from.

The "signature" that is inserted into a message is not to be limited to a signature formed by one the various arrangements of key pairs known in the art. The term is intended to encompass any data that can suitably be incorporated into data transmitted by the terminal to verify the provenance of that data.

The billing system may charge external users in dependence on the quantity of data transferred over the network on behalf of that user. Users may also be charged in dependence on a desired quality of service, in dependence on a loading associated with the base station used to transmit their data (to encourage the use of more lightly loaded base stations) and in dependence on the relative proportion of contended and allocated access slots used by their terminals.

The network core may include controllers for controlling the operation of the base stations. The controllers may perform the functions of the "network controller" referred to previously. Each controller may be configured to control one or more radios that transmits and receives data over a communication network. The controllers may be equivalent to the "base station controller" shown at 507 in FIG. 5. The radios may be equivalent to the "base station" shown at 505.

The base station controller may format data that is to be transmitted over the network into a series of frames. It may pass each frame to the base station for communication over the network, so that in effect the base stations are just provided with pre-formatted frames for transmission. The base stations may therefore be relatively simple devices that take pre-formatted frames of information and transmit them. The base stations could, therefore, be deployed by a client to cover a particular geographical area that they are interested in. The controllers would be provided by the core network and would implement the majority of the technical requirements of communicating data wirelessly. Clients would be able to plug their own, simple base stations into the network core wherever they require coverage.

Figure 6:
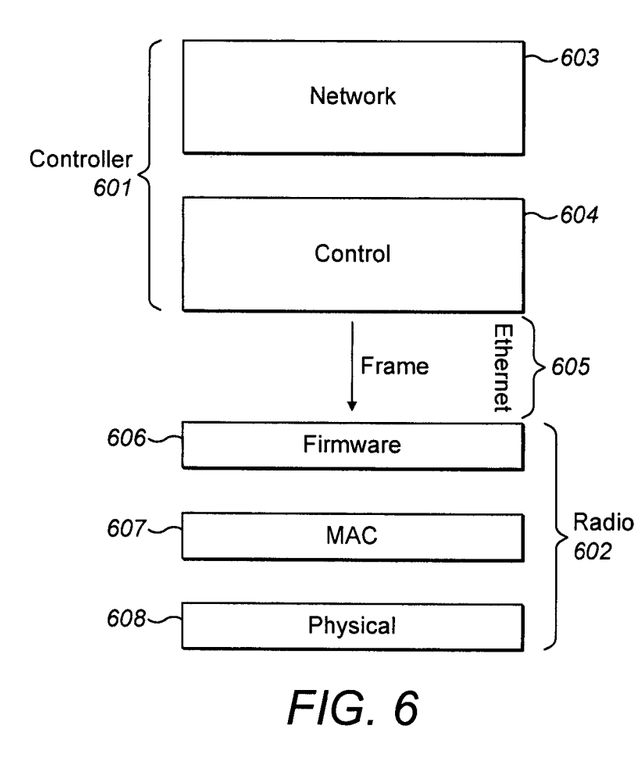
FIG. 6 shows an example of a controller and associated radio.

An example of the structure of a controller, together with its associated radio, is shown in FIG. 6. The controller (or at least part of it) is shown at 601. The controller comprises a network layer 603 and a control layer 604, both of which are implemented in software. The control layer is configured to format the data to be transmitted over the network into frames. The frames are suitably entire frames, including control and header information. These frames may then be passed, e.g. via an Ethernet connection, to the radio 602. The radio comprises a thin layer of embedded firmware 606 for presenting the formatted data to the MAC 607 and a physical layer 608 for transmitting signals over the air interface. The radio, in this embodiment, might be considered to represent a base station, while the controller might be considered to represent a base station controller.

The arrangement illustrated in FIG. 6 differs from a typical modem architecture in which the data and control planes are treated as two very separate interfaces. A typical modem has a lot of intelligence in the embedded firmware. By moving this intelligence up into the control layer, the process of programming and debugging the software is simplified considerably since it is possible to implement the control layer in a higher-level programming language than that which would be used to program firmware. Abstracting many of the communication functions from the physical layer also enables enhanced testing to be performed. Finally, moving more of the intelligence into the software renders the controller easily transferable to different physical devices. Essentially, the result is an architecture in which a simple physical device acts as the "base station" in the conventional sense, by transmitting and receiving signals over the air interface. The operation of the "base station" is controlled by a controller that can be implemented as software that is readily transferrable from one processing machine to another.

There are no strict boundaries between "firmware" and "software". However, firmware is generally considered to be software that cannot be changed without also making some changes to the underlying hardware. Firmware is typically used to perform basic, low-level operations. The term is often used to contrast with higher-level "software", which can be changed without replacing any hardware components.

The controller may be implemented as a virtual machine. For example, the part of the apparatus illustrated in FIG. 6 that controls the communication process might be implemented by a PC. The PC may act as the processing element for composing the frames. The radio might be implemented by a modem. The PC might be connected to a modem over an Ethernet connection. The controller may be implemented as a virtual machine running on the PC, so that it can be moved to a new machine without having to be adapted to the particular physical attributes of that machine. Suitably the controller is implemented using the .NET Framework, although any high-level language and development environment might be used.

The controller may be optionally configured to pass some or all of the data it receives from the radio to a computing cloud for further processing. The computing cloud may implement any or all of the logical network elements 503, 508 and 509 to 516 shown in FIG. 5. The controller may use the cloud for any or all of computation, software, data access and data storage services. The controller may make use of a public cloud, a community cloud, a private cloud or any combination of these. Suitably the "cloud" may be provided by a collection of servers comprised in a core of the communication network. Using the cloud may be beneficial because it may give the controller access to computing services that extend beyond its own capabilities. This allows the controller to be implemented in a widely-available and reasonably-priced processing machine such as a PC. Performing some or all of the processing via cloud computing might sometimes introduce additional, often random, delay. Therefore, it may be advantageous to slow the frame rate down so that there is a sufficiently long gap between receipt of a message and its response to give the controller the flexibility it needs to make use of cloud computing.

The controller suitably controls the base station to communicate the series of frames at a frame rate that is low enough for the controller to have time, between the base station receiving a message from a terminal in the network and the base station having to respond to that message, to process the received message (including e.g. authentication and/or billing), generate a response and format the response into a frame for transmission by the base station. This may be achieved by the controller controlling the base station such that there will always be a delay of at least one second between data being received over the network by the base station and the base station having to transmit a response to that data.

The frames for a network designed to operate in whitespace for machine-to-machine communication may be particularly long. Suitably, each frame has a duration of at least one second. In one example the frames may each be 2 seconds long. This allows a frequency hop on the downlink every 2 seconds (which is 30 hops per minute). Frequency hopping sequences may be coordinated over neighbouring base stations to try to minimise instances in which neighbouring base stations are transmitting on the same frequency. One straightforward option is for base stations to use the group of available frequencies in either ascending or descending order, with each base station applying a different offset to the sequence and so commencing its respective sequence on a different frequency from other base stations.

Where the frames are 2 seconds long, the delay between receipt and response may be increased to at least 2 seconds by leaving a gap of at least one frame between receiving a message and transmitting a response.

Figure 7:
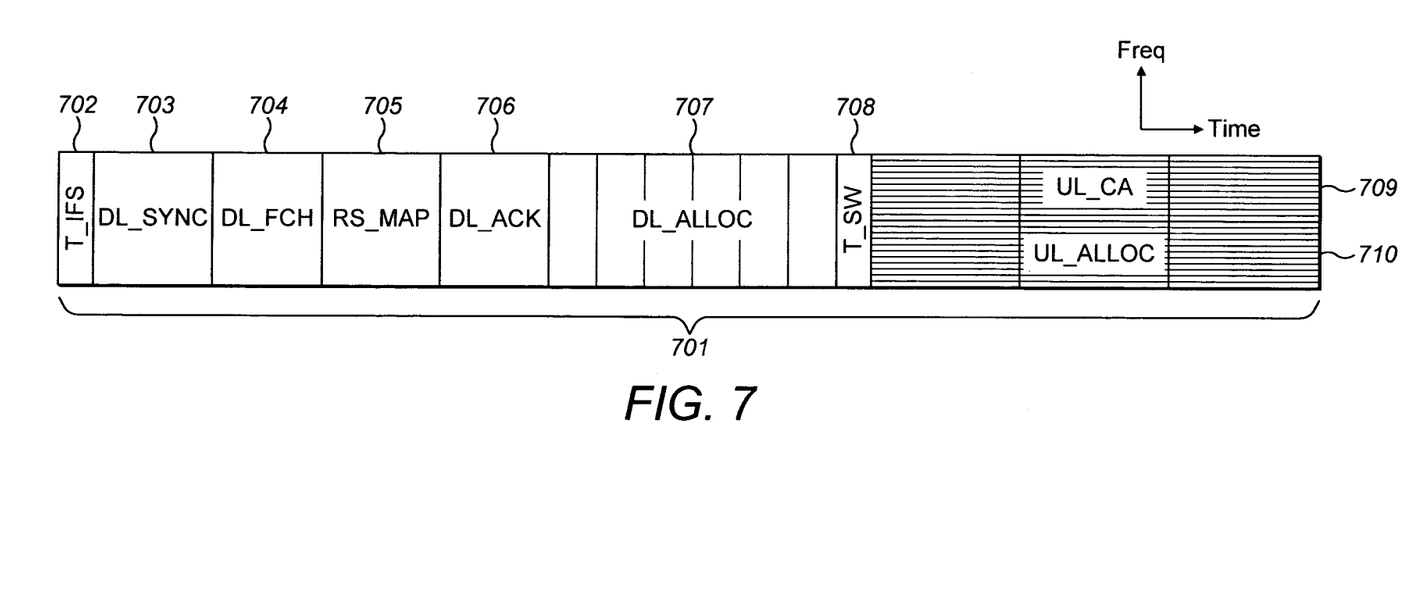
FIG. 7 shows an example of a communication frame.

In one embodiment, the network may use medium access control (MAC) to share the same radio resource between multiple terminals. An example of a suitable frame structure is shown in FIG. 7. The frame (shown generally at 701) comprises time to ramp-up to full output power 702 (T_IFS), a synchronisation burst 703 (DL_SYNC), an information field providing the subsequent channel structure 704 (DL_FCH), a map of which information is intended for which terminal 705 (DL_MAP), a field to allow acknowledgement of previous uplink transmissions 706 (DL_ACK) and then the actual information to be sent to terminals 707 (DL_ALLOC). There is then a guard period for ramp-down of the downlink and ramp-up on the uplink 708 (T_SW), followed by the allocated uplink data transmissions 710 (UL_ALLOC) in parallel with channels set aside for uplink contended access 709 (UL_CA).

Each frame may be broadly divided into control fields, such as DL_SYNC, DL_FCH, DL_MAP and DL_ACK, which impart information to the terminals about the function of the network and the arrangement of the frame, and data fields, such as DL_ALLOC, UL_ALLOC and UL_CA that are used to transfer actual information between the base station and the terminals.

The network described above with reference to one or more different embodiments of the invention provides a backbone for machine communications. External users are able to use the network to upload and download data from terminals and control the operation of those terminals. The network is suitably configured to make use of white space, thereby being capable of operating without being allocated a specific part of the frequency spectrum. The network has been described above with references to the Weightless protocol. This is for the purposes of example only and the invention is not limited to any particular communication protocol.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communications network comprising:
   multiple base stations, each capable of communicating wirelessly with one or more wireless terminals; and
   a network core communicatively coupled to the base stations, the network core comprising:
      a data cache to which base stations can write data received from terminals, the data cache being accessible from outside the network core in such a way that users external to the network core can write data to the data cache at times that are not scheduled by the network core; and
      a network controller capable of controlling the operation of the base stations, the network controller being configured to schedule a propagation to the terminals of data stored in the data cache by allocating base station transmission bandwidth for the transmission of the data to one or more of the terminals, the network controller being further configured to allocate the transmission bandwidth in dependence on a loading associated with the base station to which the one or more terminals are attached relative to a loading associated with others of the multiple base stations.

2. A communications network as claimed in claim 1, wherein:
   the data cache is further configured to store control data written to it by a user external to the network core; and
   the communications network, by propagating the control data from the data cache to the one or more terminals, is further configured to facilitate control of the one or more terminals by the user external to the network core.

3. A communications network as claimed in claim 1, wherein the data cache is accessible from outside the network core in such a way that users external to the network core can read data from the data cache at times that are not scheduled by the network core.

4. A communications network as claimed in claim 1, wherein the network core further comprises a cache controller configured to schedule updates to the data cache in such a way that base stations can write data received from terminals to the data cache immediately on receiving that data but a user external to the network core can only read that data at a time scheduled by the cache controller.

5. A communications network as claimed in claim 4, wherein the cache controller is further configured to schedule the time at which the data can be read by the external user in dependence on a predetermined update frequency associated with that data.

6. A communications network as claimed in claim 5, wherein the cache controller is further configured to schedule the time at which the external user can read the data so that there is a delay between the base stations writing that data to the data cache and that data being available to be read by the external user.

7. A communications network as claimed in claim 6, wherein the network further comprises an authentication unit, and wherein the cache controller is further configured to pass the data to the authentication unit for authentication during the delay, the authentication unit being configured to authenticate the data as having originated from one of the terminals.

8. A communications network as claimed in claim 6, wherein the communication network further comprises a billing entity configured to generate a billing record associated with the data during the delay.

9. A communications network as claimed in claim 4, wherein the cache controller is further configured to schedule the time at which the data can be read by the external user in dependence on a predetermined update frequency associated with that user.

10. A communications network as claimed in claim 1, wherein the network controller is capable of controlling the operation of the base stations and is further configured to control the base stations in accordance with a protocol for machine-to-machine communications.

11. A communications network as claimed in claim 1, wherein the network controller is capable of controlling the operation of the base stations and is further configured to control the base stations in accordance with the Weightless protocol.

12. A communications network as claimed in claim 1, wherein the network controller is further configured to format data for transmission by the base stations into a series of frames in which a duration of each frame is at least one second.

13. A communications network as claimed in claim 1, wherein the network core further comprises an authentication unit configured to authenticate any user eternal to the network core that attempts to access the data cache before permitting the user to read and/or write data to the data cache.

14. A communications network comprising:
multiple base stations, each capable of communicating wirelessly with one or more wireless terminals;
a network core communicatively coupled to the base stations, the network core comprising:
  a data cache to which base stations can write data received from terminals, the data cache being accessible from outside the network core in such a way that users external to the network core can write data to the data cache at times that are not scheduled by the network core; and
  a network controller capable of controlling the operation of the base stations, the network controller being configured to schedule a propagation to the terminals of data stored in the data cache by allocating base station transmission bandwidth for the transmission of the data to one or more of the terminals, the network controller being further configured to allocate the transmission bandwidth in dependence on a loading associated with the base station to which the one or more terminals are attached relative to a loading associated with others of the multiple base stations;
  a cache controller configured to schedule updates to the data cache in such a way that base stations can write data received from terminals to the data cache immediately on receiving that data but a user external to the network core can only read that data at a time, wherein the cache controller is further configured to schedule the time at which the external user can read the data so that there is a delay between the base stations writing that data to the data cache and that data being available to be read by the external user; and
an authentication unit, wherein the cache controller is further configured to pass the data to the authentication unit for authentication during the delay, the authentication unit being configured to authenticate the data as having originated from one of the terminals.

15. A communications network comprising:
multiple base stations, each capable of communicating wirelessly with one or more wireless terminals; and
a network core communicatively coupled to the base stations, the network core comprising:
  a data cache to which base stations can write data received from terminals, the data cache being accessible from outside the network core in such a way that users external to the network core can write data to the data cache at times that are not scheduled by the network core; and
  a network controller capable of controlling the operation of the base stations, the network controller being configured to schedule a propagation to the terminals of data stored in the data cache by allocating base station transmission bandwidth for the transmission of the data to one or more of the terminals, the network controller being further configured to allocate the transmission bandwidth in dependence on a loading associated with the base station to which the one or more terminals are attached relative to a loading associated with others of the multiple base stations;
  a cache controller configured to schedule updates to the data cache in such a way that base stations can write data received from terminals to the data cache immediately on receiving that data but a user external to the network core can only read that data at a time, wherein the cache controller is further configured to schedule the time at which the external user can read the data so that there is a delay between the base stations writing that data to the data cache and that data being available to be read by the external user; and
a billing entity configured to generate a billing record associated with the data during the delay.

* * * * *